(12) United States Patent
Barrass et al.

(10) Patent No.: US 7,142,501 B1
(45) Date of Patent: Nov. 28, 2006

(54) METHOD AND APPARATUS FOR ELIMINATING NEAR-END CROSSTALK IN A DIGITAL SUBSCRIBER LINE SYSTEM

(75) Inventors: Hugh Barrass, Milpitas, CA (US); Scott M. Simon, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 907 days.

(21) Appl. No.: 10/033,044

(22) Filed: Dec. 26, 2001

(51) Int. Cl.
*H04J 1/12* (2006.01)

(52) U.S. Cl. .................. 370/201; 379/416; 386/22
(58) Field of Classification Search ................ 370/201; 386/22; 375/285, 222
See application file for complete search history.

(56) References Cited

U.S. PATENT DOCUMENTS

| | | | | | |
|---|---|---|---|---|---|
| 3,735,266 | A | * | 5/1973 | Amitay | 370/201 |
| 4,370,741 | A | * | 1/1983 | Haass | 370/201 |
| 5,091,788 | A | * | 2/1992 | Matsuo et al. | 386/24 |
| 5,278,899 | A | * | 1/1994 | Levitan | 379/399.02 |
| 5,483,551 | A | * | 1/1996 | Huang et al. | 375/219 |
| 5,887,032 | A | * | 3/1999 | Cioffi | 375/257 |
| 6,160,790 | A | * | 12/2000 | Bremer | 370/201 |
| 6,173,021 | B1 | * | 1/2001 | Bingel et al. | 375/346 |
| 6,724,849 | B1 | * | 4/2004 | Long et al. | 375/371 |
| 6,807,236 | B1 | * | 10/2004 | Fujimura | 375/285 |
| 6,834,109 | B1 | * | 12/2004 | Pare, Jr. et al. | 379/416 |
| 2003/0219076 | A1 | * | 11/2003 | Jeong et al. | 375/260 |

OTHER PUBLICATIONS

P. Mandarini, et al., "*Combined Optimization of Transmitting and Receiving Filters for Crosstalk Suppression on Twisted-Pair Wirings*", INFOCOM Dpt, University of Rome, 5 pages, 1996.
Rohit V. Gaikwad, et al., "*Optimal Transmit Spectra for Communication in the Presence of Crosstalk*", 8th Communications Theory Mini-Conference, CTMC '99, International Conference on Communications, ICC '99, Vancouver, Canada, 5 pages, Jun. 1999.
Chaohuang Zeng, et al., "*Crosstalk Identification in xDSL Systems*", IEEE Journal on Selected Areas in Communications, vol. 19, No. 8, © 2001 IEEE, pp. 1488-1496, Aug. 2001.

* cited by examiner

*Primary Examiner*—Chi Pham
*Assistant Examiner*—Steve Blount
(74) *Attorney, Agent, or Firm*—Baker Botts L.L.P.

(57) ABSTRACT

A method and apparatus for eliminating near-end crosstalk in a communication network are disclosed. Crosstalk generated by communication occurring on a second line is detected on a first line and the phase of the crosstalk detected on the first line is determined. A first signal is communicated on the first line in response to the phase.

36 Claims, 3 Drawing Sheets

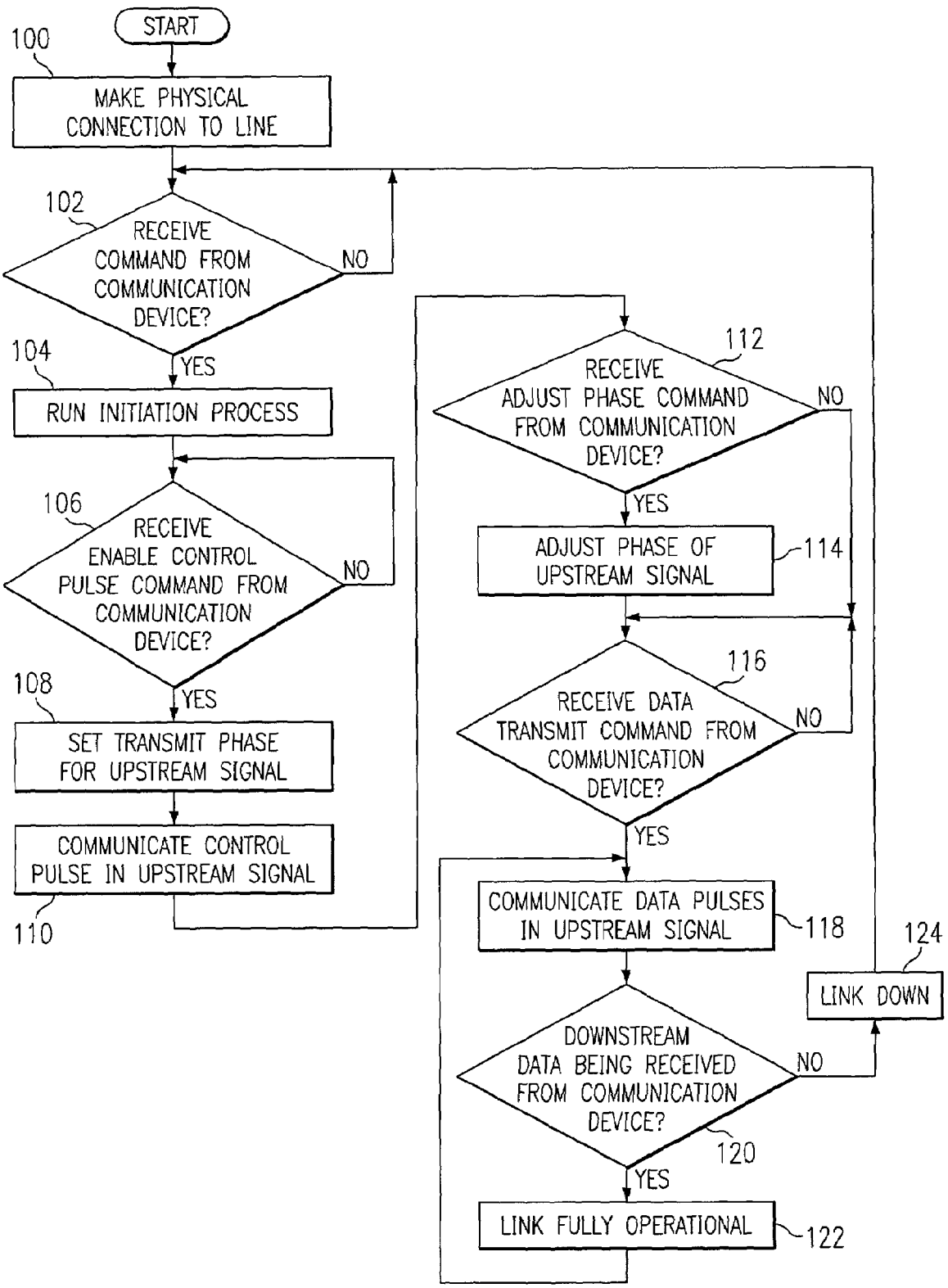

METHOD AND APPARATUS FOR ELIMINATING NEAR-END CROSSTALK IN A DIGITAL SUBSCRIBER LINE SYSTEM

TECHNICAL FIELD OF THE INVENTION

This invention relates in general to digital subscriber line (DSL) communication, and more particularly to a method and apparatus for eliminating near-end crosstalk in a DSL system.

BACKGROUND OF THE INVENTION

The recent growth of the Internet has increased the demand for additional bandwidth. Digital subscriber line (DSL) technology meets this demand by providing higher bandwidth data service over existing twisted pair telephone lines. DSL technology achieves the higher data transmission rates by taking advantage of unused frequencies, which are significantly higher than voice band frequencies, on the existing twisted pair lines.

DSL systems typically include multiple bundles of twisted pair wires that may be located within close proximity of each other. Communication occurring on one wire may degrade or substantially interrupt communication on an adjacent wire by causing crosstalk on the adjacent wire. DSL systems typically can suffer from two different types of crosstalk. Far-end crosstalk generally occurs between signals being transmitted at the same time and in the same direction on two adjacent wires. Near-end crosstalk generally occurs between signals on adjacent lines being transmitted at the same time but in opposite directions.

SUMMARY OF THE INVENTION

In accordance with the teachings of the present invention, the disadvantages and problems associated with eliminating near-end crosstalk in a digital subscriber line (DSL) system have been substantially reduced or eliminated. In a particular embodiment, a method for eliminating near-end crosstalk in a DSL system is disclosed that detects crosstalk on a first line that is created by communication occurring on a Second line and communicates a first signal in response to a phase associated with the crosstalk.

In accordance with one embodiment of the present invention, a method for eliminating near-end crosstalk in a DSL system includes detecting crosstalk on a first line caused by communication occurring on a second line. The method then determines a phase of the crosstalk detected on the first line and communicates a first signal on the first line in response to the phase.

In accordance with another embodiment of the present invention, a method for eliminating near-end crosstalk between adjacent wires in a DSL system includes detecting crosstalk on a first line caused by communication occurring on a second line. The method then synchronizes a first downstream signal with a second downstream signal communicated on the second line by matching a first phase associated with the first downstream signal to a second phase associated with the second downstream signal and communicates the first downstream signal on the first line in response to the first phase.

In accordance with a further embodiment of the present invention, an interface that couples to a network, a detector coupled to the interface and a control unit coupled to the interface and the detector. The detector detects crosstalk on a first line caused by communication occurring on a second line. The control unit determines a phase of the crosstalk detected on the first line and communicates a first signal on the first line in response to the phase.

Important technical advantages of certain embodiments of the present invention include a communication device that synchronizes communication if the communication device detects crosstalk generated by communication occurring on an adjacent line. Before beginning to communicate signals to a remote device, the communication device monitors crosstalk caused by communication occurring on adjacent lines in a DSL system. If the communication device detects crosstalk, the communication device determines a phase associated with the crosstalk and initiates communication based on the detected phase. If the communication device does not detect crosstalk, the communication device transmits signals using an arbitrary phase. The communication device, therefore, only synchronizes communication of the signals when the communication device detects crosstalk caused by communication occurring on the adjacent lines.

Another important technical advantage of certain embodiments of the present invention includes a synchronization technique that eliminates the need for direct connections between multiple communication devices located on multiple lines. In conventional communication systems that use time domain duplexing (TDD), communication on different lines is synchronized by providing direct links between the communication devices located on each line in the system. The present invention provides a passive method of synchronization that relies on the crosstalk from adjacent lines to synchronize the communication devices in the system and, therefore, eliminates the need for any direct connections between the communication devices.

All, some, or none of these technical advantages may be present in various embodiments of the present invention. Other technical advantages will be readily apparent to one skilled in the art from the following figures, descriptions, and claims.

BRIEF DESCRIPTION OF THE DRAWINGS

FIG. 5 illustrates a flowchart of a method for initiating and synchronizing communication at a remote device.

DETAILED DESCRIPTION OF THE INVENTION

Figure 1:
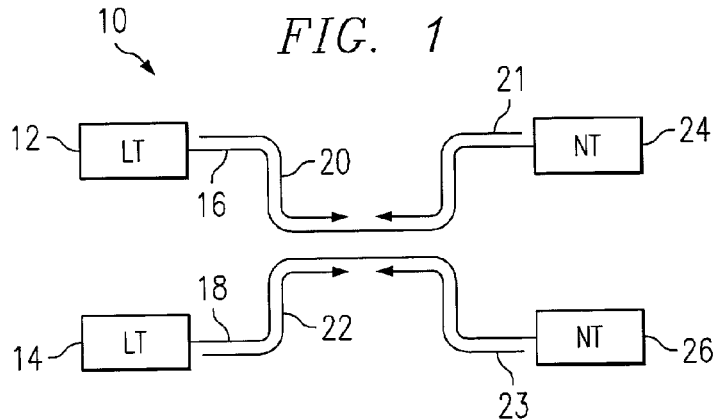
FIG. 1 illustrates a communication system in accordance with one embodiment of the present invention.

FIG. 1 illustrates a block diagram of a communication system 10 that eliminates near-end crosstalk between adjacent lines. System 10 includes line termination (LT) devices or communication devices 12 and 14 (generally referred to as communication devices 12), and network termination (NT) devices or remote devices 24 and 26 (generally referred to as remote devices 24) respectively coupled to system lines 16 and 18. System lines 16 and 18 may be a part of a network that supports communication of voice, video, data or other information (generally referred to as "information"). System lines 16 and 18 may be bundles of twisted pair wiring, such as unshielded twisted pair (UTP), shielded twisted pair (STP), or other suitable type or category of twisted pair wiring made of copper or any other suitable conductive material. In a particular embodiment, if communication device 14 detects crosstalk on system line 18 caused by communication occurring on system line 16, communication device 14 determines a phase associated with the crosstalk and communicates downstream signal 22 in response to the determined phase.

Although a specific communication system is illustrated in FIG. 1, the term "system" should be interpreted as generically defining any system capable of supporting bi-directional communication of telecommunication signals, data and/or messages. System 10 represents any suitable collection and arrangement of communications equipment supporting the transport and delivery of information between communication devices 12 and remote devices 24. System 10 may include a packet-based network, such as an Internet protocol (IP) network, an asynchronous transfer mode (ATM) network or a frame relay network, a public switched telephone network (PSTN), a local area network (LAN), a wide area network (WAN), a wireless network or any other suitable network that supports communication of voice, video and/or data information.

System 10 may support communication using protocols such as asymmetric digital subscriber line (ADSL), integrated services digital network (IDSN) DSL, symmetric DSL (SDSL), high-data-rate DSL (HDSL), rate-adaptive DSL (RADSL), very-high-data-rate DSL (VDSL) or any other suitable DSL technology or other method of transmitting digital data over analog telephone lines, digital ISDN lines, or any other appropriate communication lines (generally referred to as DSL). Maximum data transmission rates in DSL systems typically depend on the specific DSL technology used, the quality and length of twisted pair wiring, and the contribution of noise and distortion from other components throughout the system.

Certain DSL technologies provide digital data service using existing twisted pair wiring without interrupting normal telephone service. DSL systems may transmit digital data signals simultaneously with analog and/or digital voice information by using a separation technique, such as service splitters. Such splitters may be similar to those defined in ANSI standard T1.413 or other DSL standards.

Also, DSL systems may use separation techniques, such as frequency domain duplexing (FDD) or time domain duplexing (TDD), to divide upstream transmissions from downstream transmissions. An FDD system creates two different bands for frequencies, one for upstream data and the other for downstream data, and a TDD system divides upstream and downstream communication into one or more timeslots that include upstream signals and one or more timeslots that include downstream signals. In addition, the FDD system may separate frequencies that provide telephone service from those frequencies that provide data service and insert a guardband between the telephone frequency range and the data frequency range to ensure reliable and simultaneous access to data and phone service over system lines. To make optimum use of the available bandwidth, FDD systems may adjust the frequency bands used for the upstream and downstream timeslots, and TDD systems may adjust the time intervals for the upstream and downstream timeslots.

In one embodiment, communication devices 12 and remote devices 24 support DSL communication over system lines 16 and 18 using techniques, such as discrete multitone (DMT) modulation, that comply with ANSI standard T1.413. DMT modulation discretely divides the available frequencies on system lines 16 and 18 into subchannels or tones. Incoming data signals are broken down into a variety of bits and distributed to a specific combination of subchannels based on the subchannels' ability to carry the transmission. In an alternative embodiment, DSL communication over system lines 16 and 18 may be performed using a carrier-less amplitude phase (CAP) modulation technique. CAP modulation generates a modulated wave that carries amplitude and phase state changes by storing parts of a modulated message signal in memory and reassembling the parts in the modulated wave. In further embodiments, quadrature amplitude modulation (QAM) or any other suitable modulation technique may be used to support DSL communication over system lines 16 and 18.

Communication devices 12 and remote devices 24 may be DSL routers, DSL modems or any other communication devices configured to communicate DSL data signals. Communication devices 12 and remote devices 24 may include hardware and/or software that transmits and receives signals containing information to and from system lines 16 and 18. Communication devices 12 and remote devices 24 may further include hardware and/or software configured to detect crosstalk from adjacent lines and synchronize the communication of signals on system lines 16 and 18 based on the detected crosstalk. The device software or logic may be embodied in any type of medium including, but not limited to, hard drives, diskettes, CD-ROMs, DVD-ROMs, optical or magnetic media, field programmable arrays (FPGAs), embedded processors, or any other suitable media.

In operation, communication device 12 may be actively communicating downstream signal 20 to remote device 24 and receiving upstream signal 21 from remote device 24 on system line 16. Communication device 14 may be inactive but may begin an initiation process to communicate downstream signal 22 on system line 18 while communication is occurring on system line 16. During the initiation process, communication device 14 monitors system line 18 for crosstalk generated by communication occurring on any adjacent lines (e.g., system line 16). If communication device 14 detects crosstalk from communication occurring on system line 16 (e.g., either downstream signal 20 or upstream signal 21), communication device 14 determines the phase associated with the communication on system line 16. Communication device 14 then communicates downstream signal 22 based on the detected phase. For example, communication device 14 may detect that upstream signal 21 is being communicated on system line 16 when communication device 14 begins monitoring line 18. Communication device 14 then determines the appropriate amount of time to wait and transmits downstream signal 22 on system line 18 so that communication on system lines 16 and 18 is synchronized. By synchronizing communication on system line 16 with communication on system line 18, near-end crosstalk caused by signals being communicated in different directions on system lines 16 and 18 may be substantially reduced or even eliminated.

Once communication device 14 begins communicating downstream signal 22 to remote device 26, communication device 14 continues to monitor adjacent lines for interference. For example, another communication device that does not have the capability to monitor the crosstalk caused by communication on adjacent lines may initiate communication on a line adjacent to system line 18. The signals communicated by the new communication device may be out of phase compared to the communication already occurring on system line 18. This unsynchronized communication may cause interference on system line 18. When communication device 14 is not respectively transmitting or receiving downstream signal 22 and upstream signal 23 on system line 18, communication device 14 monitors adjacent lines for crosstalk. If communication device 14 detects crosstalk caused by communication on the adjacent lines, communication device 14 stops communicating downstream signal 22 and waits for an appropriate amount of time. Communication device 14 then monitors system line 16 and any other adjacent lines for crosstalk in order to re-synchronize downstream signal 22 with the detected crosstalk.

If communication device 14 does not detect any crosstalk generated by communication occurring on the adjacent lines, communication device 14 enables remote device 26 to communicate upstream signal 23. In one embodiment, communication device 14 uses a messaging protocol, such as User Datagram Protocol (UDP), Transmission Control Protocol (TCP), Stream Control Transmission Protocol (SCTP) or any other suitable messaging protocol, to instruct remote device 26 to begin communicating upstream signal 23. Upon receiving upstream signal 23, communication device 14 determines if upstream signal 23 has the correct phase. For example, communication device 14 may instruct remote device 26 to transmit upstream signal 23 without determining the amount of time that is needed for upstream signal 23 to reach communication device 14 so that it is synchronized with other upstream communication on adjacent lines (e.g., upstream signal 21 on system line 16).

If communication device 14 determines that upstream signal 23 is out of phase with the other upstream signals being communicated on the adjacent lines, communication device 14 instructs remote device 26 to adjust the phase of upstream signal 23 through a message contained in downstream signal 22 and continues the process until upstream signal 23 has the correct phase. During the adjustment period and under normal conditions, communication device 14 continues to monitor system line 18 for crosstalk caused by communication on the adjacent lines that may interfere with the communication occurring on system line 18. Although synchronization has been described in reference to communication device 12, any of communication devices 12 and/or remote devices 24 may synchronize communication on system lines 16 and 18 with communication occurring on adjacent lines.

Figure 2:
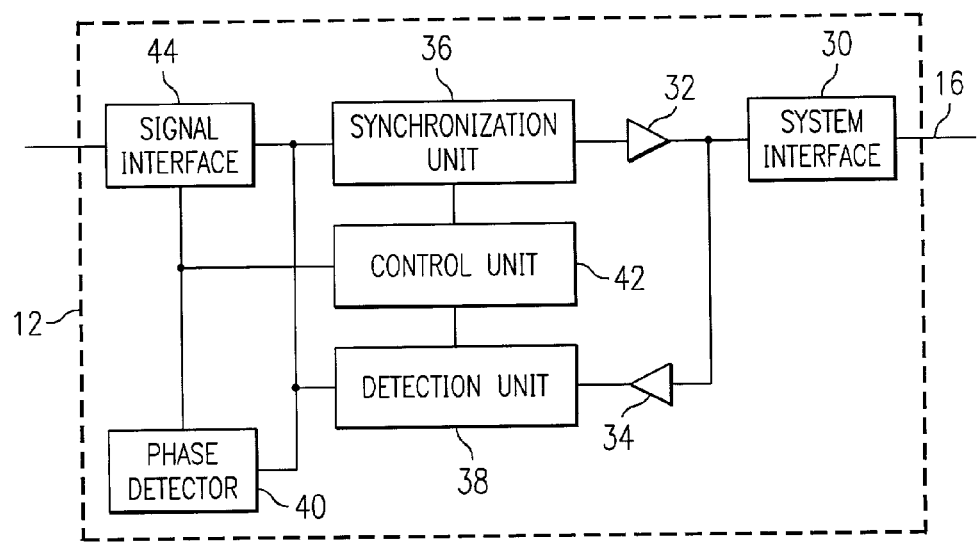
FIG. 2 illustrates a logical block diagram of a communication device in the communication system.

FIG. 2 illustrates a logical block diagram of communication device 12. Communication device 12 includes system interface 30, transmit unit 32, receive unit 34, synchronization unit 36, detection unit 38, phase detector 40, control unit 42 and signal interface 44. System interface 30 communicates downstream signal 20 to remote device 24 using system line 16 and receives upstream signal 21 from remote device 24 over system line 16. System interface 30 may be a physical port, virtual port, or other suitable direct or indirect connection. In a particular embodiment, communication device 12 detects crosstalk from communication occurring on adjacent lines, determines a phase associated with detected crosstalk and communicates downstream signal 20 in response to the determined phase. If no crosstalk is detected, communication device 12 chooses an arbitrary phase and initiates communication of downstream signal 20 over system line 16.

Transmit unit 32 and receive unit 34 may be variable gain circuits having a variety of components that process data signals for presentation to control unit 42. For example, the components forming transmit unit 32 and receive unit 34 may include components that provide gain in order to bring the data signal to a level that is compatible with other components of communication device 12.

Synchronization unit 36 may include hardware and/or software that shapes downstream signal 20 so that it has the same phase as any detected crosstalk, and a modulator and/or encoder that prepares downstream signal 20 for communication on line 16. Detection unit 38 may include hardware and/or software that equalizes upstream signal 21 and any detected crosstalk, and a demodulator and/or decoder that prepares upstream signal 21 and the detected crosstalk for communication to phase detector 40. Phase detector 40 may be separate from and/or integral to detection unit 38 and may include hardware and/or software that determines the phase associated with any detected crosstalk and upstream signal 21. Phase detector 40 may also send the determined phase to control unit 42 so that control unit 42 may determine if upstream signal 22 has the correct phase.

Control unit 42 may provide the overall control and management of signals received at and transmitted from communication devices 12. Specifically, control unit 42 may provide administrative control for synchronization unit 36 and detection unit 38, calculate the phase for downstream signal 20 based on the phase of any detected crosstalk, generate commands for transmission in downstream signal 20 that instruct remote device 24 to start transmitting upstream signal 21 and/or change the phase of upstream signal 21, and any other suitable functions that enable communication device 12 to detect crosstalk and communicate signals on system line 16. Control unit 42 further includes timer 46 that may be used to determine when communication device 12 may instruct remote device 24 to initiate communication of upstream signal 21. Control unit 42 may be one or a combination of a microprocessor, a microcontroller, a DSP, or any other digital circuitry configured to manage signals received and transmitted by communication devices 12.

In operation, communication device 12 monitors system line 16 for crosstalk caused by communication occurring on adjacent lines (e.g., system line 18). In a particular embodiment, detection unit 38 in communication device 12 receives a signal from system line 16 via system interface 30 and receive unit 34. Detection unit 38 decodes the received signal and communicates the decoded signal to phase detector 40. Phase detector 40 determines if the decoded signal contains crosstalk caused by communication occurring on system line 18. If the decoded signal contains crosstalk, phase detector 40 notifies control unit 42 that crosstalk was detected on system line 16 determines a phase associated with the crosstalk and sends the calculated phase to control unit 42. If no crosstalk is detected, phase detector 40 notifies control unit 42 that no crosstalk was detected and that control unit may communicate downstream signal 20 on system line 16 by using a arbitrary phase.

Control unit 42 then uses the phase information to communicate downstream signal 20 on system line 16. Control unit 42 first enables signal interface 44 to communicate either data or control information in downstream signal 20 to synchronization unit 36. Synchronization unit 36 encodes downstream signal and shapes the pulse associated with downstream signal 20 to synchronize downstream signal 20 with the detected crosstalk. Control unit 42 then instructs synchronization unit 36 to communicate downstream signal 20 to transmit unit 32 and enables transmit unit 32 to communicate downstream signal 20 to remote device 24 on system line 16 using system interface 30.

After initiating transmission of downstream signal 20, control unit 42 enables receive unit 34 and phase detector 40 to monitor adjacent lines during a quiet time (e.g., when no communication should be occurring in system 10) for interference caused by unsynchronized communication occurring on adjacent lines. When communication device 12 begins monitoring system line 16, control unit 42 sets timer 46. If phase detector 40 detects interference on system line 16 before timer 46 expires, phase detector 40 notifies control unit 42 that interference was detected. Control unit 42 instructs transmit unit 32 to stop communicating downstream signal 20. Control unit 42 then determines an appropriate amount of time to wait and instructs phase detector 40 to start monitoring system line 16 for crosstalk caused by communication on adjacent lines.

If timer 46 expires and phase detector 40 fails to detect any crosstalk, control unit 42 enables signal interface 44 to send downstream signal 20 to synchronization unit 36. Synchronization unit 36 encodes downstream signal 20 and sends downstream signal 20 to transmit unit 32 for communication to remote device 24. In this example, downstream signal 20 may contain control information that instructs remote device 24 to initiate communication of upstream signal 21. The control information in downstream signal 20 may be an instruction to initiate remote device 24, the detected phase of the crosstalk and/or any other appropriate information that enables remote device 24 to begin communicating upstream signal 21.

Communication device 12 then waits to receive upstream signal 21, which may include control information, from remote device 24 via system interface 30. Receive unit 34 receives upstream signal 21 and sends upstream signal 21 to detection circuit 38 for decoding. Phase detector 40 determines the phase associated with upstream signal 21 and communicates the phase information to control unit 42. Control unit 42 compares the phase information for upstream signals 21 with the phase associated with the previously detected crosstalk. If the phase information matches, the communication link between communication device 12 and remote device 24 becomes fully operational.

If the phase information associated with upstream signal 21 does not match the detected phase for the crosstalk, control unit 42 enables signal interface 44 so that a phase adjust command may be sent to remote device 24 in downstream signal 20. The phase adjust command signal may contain the amount to adjust the phase so that the control signal from remote device 24 arrives at communication device 12 during the correct time period. Control unit 42 continues to check and adjust the phase of upstream signal 21 until upstream signal 21 has the correct phase. When the link is fully operational, control unit 42 instructs phase detector 40 to monitor adjacent lines for interference. Although FIG. 2 illustrates communication device 12, it should be contemplated that communication device 14 and remote devices 24 include the same components and perform the same functions as described above for communication device 12.

Figure 3:
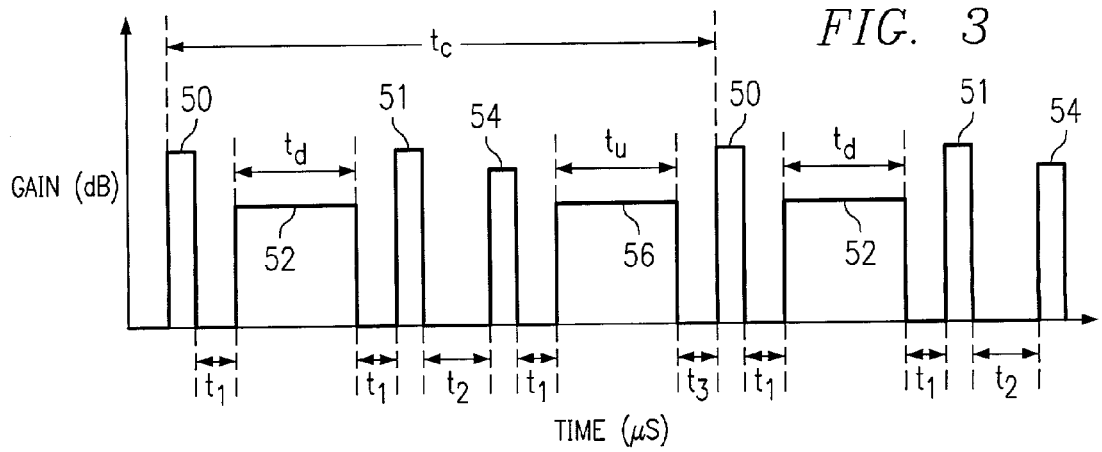
FIG. 3 illustrates a graph of various pulse characteristics that may be used to synchronize the communication device.

FIG. 3 illustrates a graph of various pulse characteristics that may be used to synchronize communication devices 12. Traditionally, duplexing has been implemented by using FDD, which dedicates two separate and distinct frequency bands, one for upstream communication and one for downstream communication. The two bands are typically of equal size and are separated by an unused frequency band, also known as a guardband, that provides the necessary isolation between the downstream and upstream frequency band and allows the FDD system to operate properly. In order to eliminate near-end crosstalk in the FDD system, an expensive filter must be used to filter out either the downstream communication or the upstream communication.

An alternative to FDD is TDD. In a TDD system, the downstream and upstream communications occur in the same frequency range but at different times within a fixed time interval. Since the downstream and upstream bands occur within the same frequency range, a guardband between the upstream and downstream communications is not needed. Furthermore, since the duplexing is performed in the time domain, expensive frequency filters are not needed to separate upstream and downstream communications.

However, since the duplexing occurs in the time domain in a TDD system, signals being communicated on adjacent lines should be synchronized with each other. The present invention provides a technique for detecting the phase of the crosstalk on system lines 16 and 18 caused by communication on adjacent lines in order to synchronize the communication within system 10. As illustrated in FIG. 3, downstream signals 20 and 22, and upstream signals 21 and 23 may respectively consist of downstream control pulses 50 and 51 and downstream data pulses 52, and upstream control pulses 54 and upstream data pulses 56. Phase detector 40 located in communication devices 12 may use the sequences, widths and/or amplitudes of downstream control pulses 50 and 51, downstream data pulses 52, upstream control pulses 54 and upstream data pulses 56 to detect the phase of the crosstalk associated with communication occurring on adjacent lines. The detected phase may then be used to synchronize communication from communication devices 12 on system lines 16 and 18 with the other communication occurring in system 10.

In one embodiment, the sequence of downstream control pulses 50 and 51 and downstream data pulses 50, in addition to upstream control pulses 54 and upstream data pulses 56, may be used to convey phase information associated with the crosstalk created by communication on adjacent lines. For example, the cycle time ($t_c$) of communication occurring in system 10 may be defined by the time period between two downstream control pulses 50 and may be between approximately one millisecond (ms) and approximately fifteen milliseconds. The control gap ($t_1$) between data control pulses 50 and 51 and downstream data pulse 52 and upstream control pulse 54 and upstream data pulse 56 may represent the time that elapses between a data pulse and a control pulse. In one embodiment, $t_1$ may be approximately one microsecond (µs). The turnaround gap ($t_2$) may represent the time that elapses between downstream control pulse 51 and upstream control pulse 54 and may be a quiet period during which no communication should be occurring in system 10. In one embodiment, $t_2$ may be longer than the maximum expected loop delay and may be approximately fifty microseconds. The cycle gap ($t_3$) may represent the time that elapses between upstream data pulse 56 and downstream control pulse 50. In one embodiment, $t_3$ may be less than approximately two microseconds.

If phase detector 40 detects a sequence, such as a short pulse (e.g., downstream control pulse 50), a short gap (e.g., $t_1$), a long pulse (e.g., downstream data pulse 52), a short gap (e.g., $t_1$), a short pulse (e.g., downstream control pulse 51) and a long gap (e.g., $t_2$), communication device 12 may determine that the communication occurring on adjacent lines is in the downstream phase. If phase detector 40 detects a short pulse (e.g., upstream data pulse 56), a short gap (e.g., $t_1$), a long pulse (e.g., upstream data pulse 56), a short gap (e.g., $t_3$) and a short pulse (e.g., downstream control pulse 50), communication device 12 may determine that the communication occurring on adjacent lines is in the upstream phase. Phase detector 40 may determine if the pulse being received is a control pulse or a data pulse by measuring the width and/or amplitude of the pulse. For example, in the illustrated embodiment, downstream control pulses 50 and 51 and upstream control pulses 54 have widths smaller than downstream data pulses 52 and upstream data pulses 54.

In another embodiment, phase detector 40 may use the width and/or amplitude of downstream data pulse 52 and upstream data pulse 56 to determine the phase of the crosstalk caused by communication occurring on adjacent lines. For example, communication device 12 may distinguish downstream and upstream communication by measuring the width of downstream data pulse 52 and upstream data pulse 56. The width ($t_d$) of downstream data pulse 52 may be greater than approximately half of the available time in the cycle ($t_c$) after subtracting the time used by downstream control pulses 50 and 51, upstream control pulse 54, $t_1$, $t_2$ and $t_3$. The width ($t_u$) of upstream data pulse 56 may be greater than ten times the width of upstream control pulse 54. In one embodiment, $t_u$ may be approximately one hundred microseconds.

In the illustrated embodiment, downstream data pulse 52 has a width greater than upstream data pulse 56. If pulse detector 40 detects the larger pulse first, communication device 12 may determine that the communication occurring on adjacent lines is in the downstream phase. If pulse detector 40 detects the smaller pulse first, communication device 12 may determine that the communication occurring on adjacent lines is in the upstream phase. In alternative embodiments, downstream data pulse 52 may have a width less than the width of upstream data pulse 56.

In a further embodiment, phase detector 40 may use the widths and/or amplitudes of downstream control pulses 50 and 51 and upstream control pulses 54 to determine the phase of the crosstalk caused by communication occurring on adjacent lines. Downstream control pulses 50 and 51 and upstream control pulses 54 may be wide enough to allow receive unit 34 to identify the pulses as signals. In one embodiment, the width of downstream control pulses 50 and 51 and upstream control pulses 54 may be approximately ten microseconds.

In the illustrated example, downstream control pulses 50 and 51 have a different amplitude than upstream control pulses 54. If phase detector 40 detects a pulse with a large amplitude, communication device 12 may determine that the communication on the adjacent lines is in the downstream phase. Alternatively, if phase detector 40 detects a pulse with a small amplitude, communication device 12 may determine that the communication on the adjacent lines is in the upstream phase. In other embodiments, downstream control pulse 50 may have an amplitude that is less than the amplitude of upstream control pulse 54 and/or a width that is less than the width of upstream control pulse 54. Although FIG. 3 illustrates a particular method of identifying the phase associated with communication occurring in system 10, any suitable arrangement of control and/or data pulses may be used to identify the character of the communication in system 10 and the timing of any crosstalk created by adjacent lines.

Figure 4:
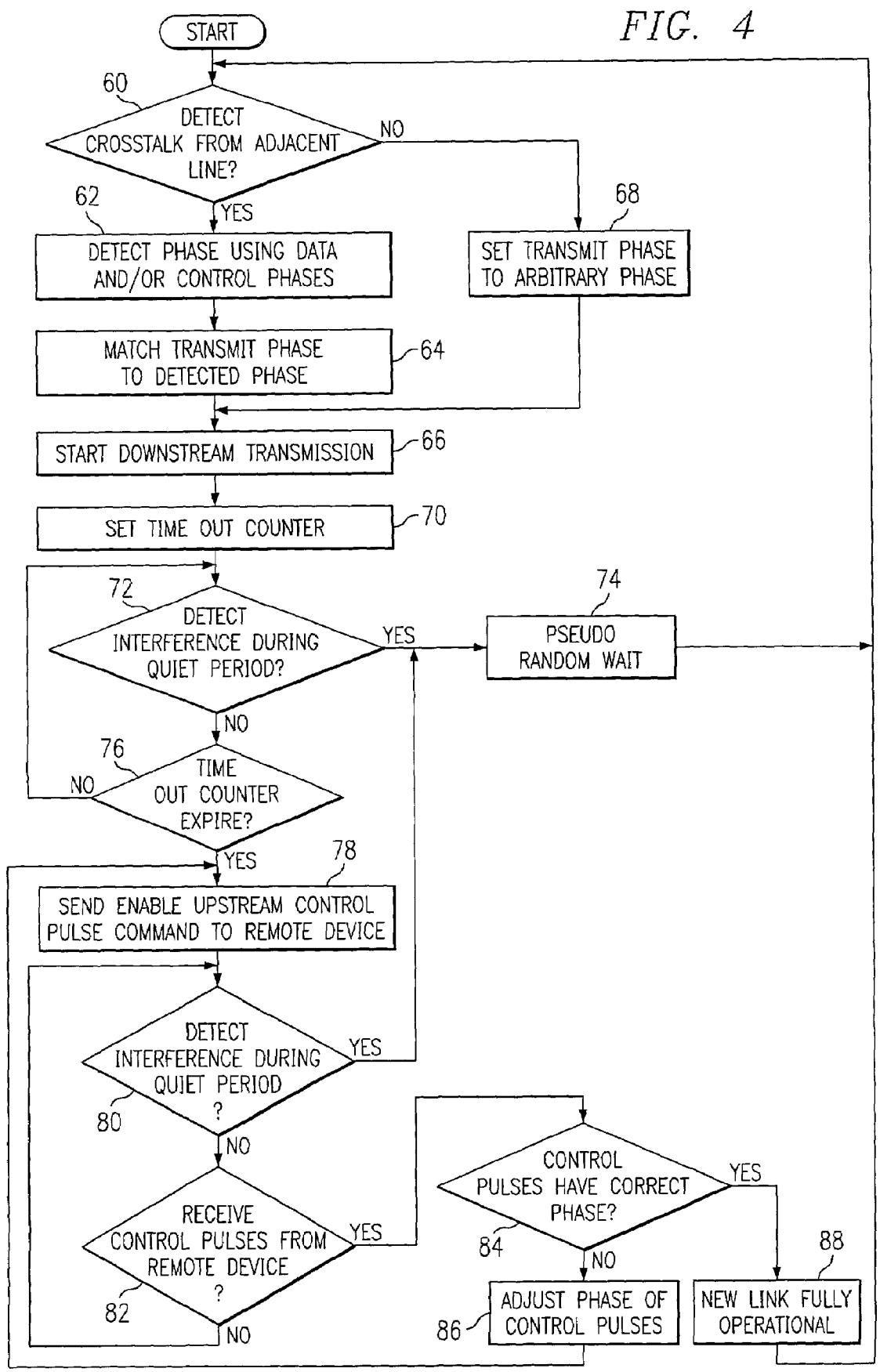
FIG. 4 illustrates a flowchart of a method for eliminating near-end crosstalk from a digital subscriber line (DSL) system.

FIG. 4 illustrates a flow chart of a method for eliminating crosstalk in system 10. Generally, communication device 12 monitors system line 16 for crosstalk that may be caused by communication on adjacent lines. If the crosstalk is present, communication device 12 synchronizes transmission of downstream signal 20 with the detected crosstalk. Communication device 12 then continues to monitor the adjacent lines for interference when no signals are being transmitted or received by communication device 12. If communication device 12 does not detect any interference in a suitable amount of time, communication device 12 enables communication of upstream signal 21 from remote device 24 and adjusts the phase associated with upstream signal 21 if the phase does not match the phase associated with the detected crosstalk.

At step 60, communication device 12 begins monitoring system line 16 for crosstalk caused by communication occurring on adjacent lines (e.g., system line 18). If any crosstalk is detected on system line 16, phase detector 40 in communication device 12 determines the phase associated with the communication occurring on the adjacent lines at step 62. As described above in reference to FIG. 3, numerous techniques may be used to determine the phase associated with detected the crosstalk. For example, phase detector 40 may determine the phase of the crosstalk by analyzing the sequence of downstream control pulses 50 and 51 and downstream data pulses 52 and upstream control pulses 54 and upstream data pulses 56. In another embodiment, phase detector 40 may determine the phase of the communication occurring on adjacent lines by measuring the widths of downstream data pulse 52 and upstream data pulse 56. In a further embodiment, phase detector 40 may determine the phase of the crosstalk associated with the communication occurring on adjacent lines by measuring the amplitude and/or width of downstream control pulses 50 and 51 and upstream control pulse 54.

Once phase detector 40 has determined the phase associated with the detected crosstalk, control unit 42 matches the transmit phase for downstream signal 20 to the phase associated with the detected crosstalk at step 64. Downstream signal 20 may include one or both of downstream control pulses 50 and 51 and downstream data pulse 52. Control unit 42 then initiates communication of downstream signal 20 by sending the transmit phase to synchronization unit 36. Synchronization unit 36 uses the transmit phase to communicate downstream signal 20 on system line 16 using transmit unit 32 and system interface 30 at step 66. If communication device 12 does not detect any crosstalk caused by adjacent lines, control unit 42 chooses an arbitrary phase and instructs synchronization unit 36 to use the arbitrary phase when communicating downstream signal 20 at step 68. Transmit unit 32 then communicates downstream signal 20 to remote device 24 using system interface 30 at step 66.

At step 70, control unit 42 in communication device 12 sets timer 46 after communicating downstream signal 20 to remote device 24. In one embodiment, timer 46 may expire after approximately ten cycles and each cycle may be between approximately one milliseconds (ms) and approximately ten milliseconds. At step 72, communication device 12 monitors adjacent lines (e.g., system line 16) during a time period when no signals are being transmitted or received by communication device 12 on system line 16 for any interference caused by the adjacent lines. For example, communication device 12 may not be communicating any signals in the control gap ($t_1$), the turnaround gap ($t_2$), and the cycle gap ($t_3$) or the upstream period (tu). During the quiet periods, any detected interference may indicate that a communication device on one of the adjacent lines has started communicating signals without synchronizing the signals with communication occurring on other lines in system 10. For instance, the unsynchronized signals may be attributable to another transmitter that started at approximately the same time as communication device 12 or to another transmitter that is unable to detect the crosstalk in the same manner as communication device 12.

If communication device 12 detects interference, communication device 12 stops communicating downstream signal 20 and waits for a period of time before monitoring the adjacent lines for crosstalk at step 74. In one embodiment, the wait period may be based on a specific number of communication cycles. In another embodiment, the wait period may be pseudo random as determined by control unit 42. After the wait period, communication device 12 returns to step 60 in order to monitor system line 16 for crosstalk caused by communication on the lines. If communication device 12 does not detect any interference, communication device 12 determines if timer 46 has expired at step 76. If the counter has not expired, communication device 12 continues to monitor the adjacent lines for interference caused by other communication devices initiating communication that has not been synchronized with the existing communication on system line 16 at step 72.

If the counter has expired, communication device 12 sends commands and/or instructions in downstream signal 20 that enable remote device 24 to initiate communication of upstream signal 21 with an initial phase at step 78. In one embodiment, communication device 12 may only enable remote device 24 to communicate upstream control pulse 54 in upstream signal 21. In alternative embodiments, communication device 12 may enable remote device 24 to communicate upstream control and data pulses 54 and 56 in upstream signal 21. The command may include the width and/or timing of upstream control and data pulses 54 and 56. For example, communication device 12 may instruct remote device 24 to communicate upstream control pulse 54 after the occurrence of turnaround gap ($t_2$) with a width of approximately ten microseconds.

At step 80, after sending the enable upstream control pulse, communication device 12 continues to monitor the adjacent lines for interference caused by other communication devices initiating communication that has not been synchronized with the existing communication on system line 16. If interference is detected, communication device 12 stops communicating downstream signal 20, waits for a period of time, and then returns to step 60, as indicated at step 74 and described above. However, if interference is not detected, communication device 12 determines at step 82 whether it has received upstream signal 21 from remote device 24. If not, communication device 12 returns to step 80 to continue monitoring the adjacent lines for interference while waiting to receive upstream signal 21 from remote device 24.

At step 84, once communication device 12 has received upstream signal 21 without detecting interference, communication device 12 then determines if upstream signal 21 has the correct phase. If upstream signal 21, does not have the correct phase, communication device 12 sends a command in downstream signal 20 that instructs remote device 24 to adjust the phase of upstream signal 21 at step 86. For example, communication device 12 may receive upstream signal 22 at the same time that communication device 12 is communicating downstream signal 20 to remote device 24. The overlap in communication may create near-end crosstalk and effect communication occurring on either of system lines 16 and 18. In order to eliminate the potential near-end crosstalk, communication device 12 may instruct remote device 24 to communicate upstream signal 21 at an earlier or later time so that upstream signal 21 arrives at communication device 12 at the appropriate time. If upstream signal 21 does have the correct phase, communication device 12 continues to communicate downstream signal 20 and receive upstream signal 21 on the fully operation link at step 88. Communication device 12 then returns to step 60 in order to monitor system line 16 for crosstalk caused by communication on the lines.

FIG. 5 illustrates a flow chart of a method for initiating communication at remote devices 24. Generally, when communication devices 12 initiate communication on system lines 16 and 18, communication devices 12 send command signals in downstream signals 20 and 22 to remote devices 24. The command signals may set parameters associated with communication from remote devices 24, set the phase associated with upstream signals 21 and 23 and adjust the phase of upstream signals 21 and 23 if upstream signals 21 and 23 arrive earlier or later than planned at communication devices 14.

At step 100, remote device 24 establishes a physical connection to system line 16 in order to receive downstream signal 20 from communication device 12. At step 102, remote device 24 determines if downstream signal 20 includes a command signal. If downstream signal does not include a command signal, remote device 24 remains inactive and continues to wait for the command signal at step 102. If remote device 24 receives the command signal from communication device 12, remote device 24 becomes active and starts an initiation process at step 104. The initiation process may include programming registers in remote device 24, setting communication parameters associated with system line 16, or any other functions that may be suitable to prepare remote device for communicating upstream signal 21 on system line 16.

After completing the initiation process, remote device 24 waits for an enable command in downstream signal 20 that instructs remote device 24 to communicate upstream control pulse 54 in upstream signal 21 at step 106. If remote device 24 receives the enable command from communication device 12, remote device 24 sets the phase associated with upstream signal 21 at step 108. In one embodiment, the phase associated with upstream signal 21 may be set to zero, which corresponds to the end of the turnaround gap ($t_2$). Remote device 24 then communicates upstream control pulse 54 in upstream signal 21 to communication device 12 at step 110. Remote device 24 continues to transmit upstream control pulse 54 in upstream signal 21 unless remote device 24 receives a phase adjust command from communication device 12 at step 112. If the phase adjust command indicates that the phase of upstream signal 22 is incorrect, remote device 24 adjusts the phase based on the value contained in the phase adjust command at step 114. For example, if upstream signal 21 is arriving late at communication device 12, communication device 12 may instruct remote device 24 to increase the phase of upstream signal 21 to the appropriate value.

If remote device 24 does not receive a phase adjust command from communication device 12 or after the phase of upstream signal 21 has been properly adjusted, remote device 24 waits to receive a data transmit command from communication device 12 at step 116. When remote device 24 receives the data transmit command, remote device 24 communicates upstream data pulse 56 in upstream signal 2' to communication device 12 at step 118. Remote device 24 then determines if downstream data pulse 52 is being received from communication device 12 at step 120. If downstream data pulse 52 is being received, the link between communication device 12 and remote device 24 is fully operational and remote device 24 continues to communicate upstream control pulses 54 and/or upstream data pulses 56 to communication device 12 using system line 16 at step 122. If remote device 24 determines that it is no longer receiving downstream data pulse 52 in downstream signal 20 from communication device 12, the communication link between communication device 12 and remote device 24 is disabled at step 124. Remote device 24 then returns to step 102 to wait for an initiation command from communication device 12.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for eliminating near-end crosstalk in a digital subscriber line (DSL) system, comprising:
   detecting crosstalk on a first line communicating a first signal in a first direction, the crosstalk generated by communication of a second signal occurring on a second line, the second signal communicated in a second direction opposite the first direction;
   determining a phase of the crosstalk detected on the first line; and
   communicating the first signal on the first line in response to the phase to synchronize the first signal with the second signal, the first signal synchronized with the second signal to preemptively avoid the detected crosstalk.

2. The method of claim 1, further comprising selecting an arbitrary phase for the first signal if a communication device coupled to the first line fails to detect the crosstalk.

3. The method of claim 1, wherein determining a phase of the crosstalk detected on the first line comprises:
   detecting a pulse sequence associated with the second signal communicated on the second line, the pulse sequence comprising a plurality of first pulses communicated in the first direction and a plurality of second pulses communicated in the second direction; and
   setting the phase of the first signal based on the pulse sequence.

4. The method of claim 1, wherein determining the phase of the crosstalk detected on the first line comprises:
   detecting a data pulse associated with the second signal communicated on the second line based on an width associated with the data pulse; and
   setting the phase of the first signal based on the width of the data pulse.

5. The method of claim 1, wherein determining the phase of the crosstalk detected on the first line comprises:
   detecting a control pulse associated with the second signal communicated on the second line based on an amplitude associated with the control pulse; and
   setting the phase of the first signal based on the amplitude of the control pulse.

6. The method of claim 1, further comprising monitoring a third line for interference generated by a third signal after communicating the first signal on the first line.

7. The method of claim 1, further comprising:
   monitoring a third line for interference generated by a third signal after communicating the first signal on the first line; and
   receiving a control signal from a remote device if a communication device coupled to the first line fails to detect the interference on the third line.

8. The method of claim 1, further comprising:
   monitoring a third line for interference generated by a third signal after communicating the first signal on the first line;
   receiving a control signal from a remote device if a communication device coupled to the first line fails to detect the interference on the third line;
   determining if a control phase associated with the control signal is correct; and
   adjusting the control phase if the communication device receives the control signal when the third signal is being communicated on the third line.

9. The method of claim 1, further comprising:
   monitoring a third line for interference generated by a third signal after communicating the first signal on the first line;
   receiving a control signal from a remote device if a communication device coupled to the first line fails to detect the interference on the third line;
   determining if a control phase associated with the control signal is correct;
   adjusting the control phase if the communication device receives the control signal when the third signal is being communicated on the third line; and
   communicating a command on the first line to the remote device, the command operable to initiate communication of a data signal from the remote device.

10. The method of claim 1, wherein the first and second lines comprise twisted pair wiring.

11. The method of claim 1, wherein the first signal is communicated using a time domain duplexing (TDD) technique.

12. The method of claim 1, further comprising:
    monitoring a third line for interference generated by a third signal after communicating the first signal on the first line; and
    ending communication of the first signal on the first line if a communication device coupled to the first line detects interference on the third line.

13. A method for eliminating near-end crosstalk on adjacent lines in a digital subscriber line (DSL) system, comprising:
    detecting crosstalk on a first line communicating a first signal in a first direction, the crosstalk generated by communication of a second signal occurring on a second line, the second signal communicated in a second direction opposite the first direction;
    synchronizing a first downstream signal with a second downstream signal communicated on the second line by matching a first phase associated with the first downstream signal to a second phase associated with the second downstream signal, the first downstream signal synchronized with the second downstream signal to preemptively avoid the detected crosstalk; and
    communicating the first downstream signal on the first line in response to the first phase.

14. The method of claim 13, further comprising selecting an arbitrary phase for the first downstream signal if crosstalk is not detected.

15. The method of claim 13, wherein synchronizing a first downstream signal with the second downstream signal comprises:
    detecting a pulse sequence associated with the second downstream signal, the pulse sequence comprising a plurality of first pulses communicated in the first direction and a plurality of second pulses communicated in the second direction; and setting the first phase of the first downstream signal based on the pulse sequence.

16. The method of claim 13, wherein synchronizing a first downstream signal with the second downstream signal comprises:
   detecting a data pulse associated with the second downstream signal based on an width associated with the data pulse; and
   setting the first phase of the first downstream signal based on the width of the data pulse.

17. The method of claim 13, wherein synchronizing a first downstream signal with the second downstream signal comprises:
   detecting a control pulse associated with the second downstream signal based on an amplitude associated with the control pulse; and
   setting the first phase of the first downstream signal based on the amplitude of the control pulse.

18. The method of claim 13, further comprising:
   monitoring a third line for interference generated by a third downstream signal after communicating the downstream signal on the first line; and
   receiving an upstream control signal on the first line if interference is not detected on the third line.

19. The method of claim 13, further comprising:
   monitoring a third line for interference generated by a third downstream signal after communicating the first downstream signal on the first line;
   receiving an upstream control signal on the first line if interference is not detected on the third line;
   determining if a control phase associated with the upstream control signal is correct; and
   adjusting the control phase if the upstream control signal is received when the third downstream signal is being communicated on the third line.

20. A communication device, comprising:
   an interface operable to couple to a network and receive communication from a first line;
   a detector coupled to the interface, the detector operable to detect crosstalk on the first line communicating a first signal in a first direction, the crosstalk generated by communication of a second signal occurring on a second line, the second signal communicated in a second direction opposite the first direction; and
   a control unit coupled to the interface and the detector, the control unit operable to:
      determine a phase of the crosstalk detected on the first line; and
      communicate the first signal on the first line in response to the phase to synchronize the first signal with the second signal, the first signal synchronized with the second signal to preemptively avoid the detected crosstalk.

21. The communication device of claim 20, wherein the control unit is further operable to select an arbitrary phase for the first signal if no crosstalk is detected on the first line.

22. The communication device of claim 20, wherein the control unit determines the phase of the crosstalk by:
   detecting a pulse sequence associated with the second signal communicated on the second line, the pulse sequence comprising a plurality of first pulses communicated in the first direction and a plurality of second pulses communicated in the second direction; and
   setting the phase of the first signal based on the pulse sequence.

23. The communication device of claim 20, wherein the control unit determines the phase of the crosstalk by:

detecting a data pulse associated with the second signal communicated on the second line based on an width associated with the data pulse; and
   setting the phase of the first signal based on the width of the data pulse.

24. The communication device of claim 20, wherein the control unit determines the phase of the crosstalk by:
   detecting a control pulse associated with the second signal communicated on the second line based on an amplitude associated with the control pulse; and
   setting the phase of the first signal based on the amplitude of the control pulse.

25. The communication device of claim 20, wherein the detector is further operable to monitor a third line for interference generated by a third signal after communicating the first signal on the first line.

26. The communication device of claim 20, wherein:
   the detector is further operable to monitor a third line for interference generated by a third signal after communicating the first signal on the first line; and
   the control unit is further operable to receive a control signal from the first line if no interference is detected on the third line.

27. The communication device of claim 20, wherein:
   the detector is further operable to monitor a third line for interference generated by a third signal after communicating the first signal on the first line; and
   the control unit is further operable to:
      receive a control signal from the first line if no interference is detected on the third line;
      determine if a control phase associated with the control signal is correct; and
      adjust the control phase if the detector receives the control signal when the third signal is being transmitted on the third line.

28. The communication device of claim 20, wherein:
   the detector is further operable to monitor a third line for interference generated by a third signal after communicating the first signal on the first line; and
   the control unit is further operable to:
      receive a control signal from a the first line if no interference is detected on the third line;
      determine if a control phase associated with the control signal is correct;
      adjust the control phase if the detector receives the control signal when the third signal is being transmitted on the third line; and
      communicate a command to the first line, the command operable to initiate communication of a data signal from a remote device.

29. The communication device of claim 20, wherein the control unit communicates the first signal on the first line using a time domain duplexing (TDD) technique.

30. Logic encoded in media for eliminating near-end crosstalk in a communication network and operable to perform the following steps:
   detecting crosstalk on a first line communicating a first signal in a first direction, the crosstalk generated by communication of a second signal occurring on a second line, the second signal communicated in a second direction opposite the first direction;
   determining a phase of the crosstalk detected on the first line; and
   communicating the first signal on the first line in response to the phase to synchronize the first signal with the second signal, the first signal synchronized with the second signal to preemptively avoid the detected crosstalk.

31. The logic of claim 30, wherein determining a phase of the crosstalk detected on the first line comprises:
  detecting a pulse sequence associated with the second signal communicated on the second line, the pulse sequence comprising a plurality of first pulses communicated in the first direction and a plurality of second pulses communicated in the second direction; and
  setting the phase of the first signal based on the pulse sequence.

32. The logic of claim 30, wherein determining the phase of the crosstalk detected on the first line comprises:
  detecting a data pulse associated with the second signal communicated on the second line based on an width associated with the data pulse; and
  setting the phase of the first signal based on the width of the data pulse.

33. The logic of claim 30, wherein determining the phase of the crosstalk detected on the first line comprises:
  detecting a control pulse associated with the second signal communicated on the second line based on an amplitude associated with the control pulse; and
  setting the phase of the first signal based on the amplitude of the control pulse.

34. The logic of claim 30, further comprising:
  monitoring a third line for interference generated by a third signal after communicating the first signal on the first line; and
  receiving a control signal from the remote device if a communication device coupled to the first line fails to detect the interference on the third line.

35. The logic of claim 30, further comprising:
  monitoring a third line for interference generated by a third signal after communicating the first signal on the first line;
  receiving a control signal from a remote device if a communication device coupled to the first line fails to detect the interference on the third line;
  determining if a control phase associated with the control signal is correct;
  adjusting the control phase if the communication device receives the control signal when the third signal is being communicated on the third line; and
  communicating a command to the remote device, the command operable to initiate communication of a data signal from the remote device.

36. A apparatus for eliminating near-end crosstalk in a communication network, comprising:
  means for detecting crosstalk on a first line communicating a first signal in a first direction, the crosstalk generated by communication of a second signal occurring on a second line, the second signal communicated in a second direction opposite the first direction;
  means for determining a phase of the crosstalk detected on the first line; and
  means for communicating the first signal on the first line in response to the phase to synchronize the first signal with the second signal, the first signal synchronized with the second signal to preemptively avoid the detected crosstalk.

* * * * *